United States Patent
Tracy et al.

(10) Patent No.: US 11,319,995 B1
(45) Date of Patent: May 3, 2022

(54) SYSTEM AND METHOD FOR BEARING ASSEMBLY REMOVAL

(71) Applicants: Joshua Tracy, Harrisburg, SD (US); Alex Pearson, Sioux Falls, SD (US); Roy Olson, Sioux Falls, SD (US)

(72) Inventors: Joshua Tracy, Harrisburg, SD (US); Alex Pearson, Sioux Falls, SD (US); Roy Olson, Sioux Falls, SD (US)

(73) Assignee: Pearson Incorporated, Sioux Falls, SD (US)

( * ) Notice: Subject to any disclaimer, the term of this patent is extended or adjusted under 35 U.S.C. 154(b) by 1 day.

(21) Appl. No.: 17/099,868

(22) Filed: Nov. 17, 2020

(51) Int. Cl.
| | |
|---|---|
| *F16C 35/00* | (2006.01) |
| *F16C 35/10* | (2006.01) |
| *F16C 35/067* | (2006.01) |
| *F16C 35/06* | (2006.01) |
| *F16C 35/02* | (2006.01) |

(52) U.S. Cl.
CPC .............. *F16C 35/10* (2013.01); *F16C 35/02* (2013.01); *F16C 35/062* (2013.01); *F16C 35/067* (2013.01); *F16C 2226/60* (2013.01)

(58) Field of Classification Search
CPC .......... F16C 35/02; F16C 35/10; F16C 35/12; F16C 35/062; F16C 35/067; F16C 2226/60
See application file for complete search history.

(56) References Cited

U.S. PATENT DOCUMENTS

| | | | | |
|---|---|---|---|---|
| 3,345,116 A | * | 10/1967 | Hilton | F16C 35/02 384/213 |
| 6,045,268 A | * | 4/2000 | Long | F16C 35/063 384/537 |
| 6,568,859 B1 | * | 5/2003 | Stegmeier | F16C 35/042 384/559 |
| 8,047,719 B2 | * | 11/2011 | Yuan | H02K 7/003 384/438 |

FOREIGN PATENT DOCUMENTS

| | | | | | |
|---|---|---|---|---|---|
| CN | 108071697 A | * | 5/2018 | | |
| CN | 112412986 A | * | 2/2021 | | |
| JP | 2016053413 A | * | 4/2016 | ............ | F16C 33/586 |
| WO | WO-2013160130 A1 | * | 10/2013 | ............ | A01B 71/04 |

* cited by examiner

*Primary Examiner* — Phillip A Johnson
(74) *Attorney, Agent, or Firm* — Jeffrey A. Proehl; Woods, Fuller, Shultz & Smith, PC

(57) ABSTRACT

A bearing assembly for rotatably supporting a rotating body on a frame may include a bearing support block having a plurality of block mounting bores for each being axially aligned with a bearing mounting hole formed in the frame, and at least one mounting bolt removably insertable into one of the block mounting bores and into a bearing mounting hole, with the mounting bolt having exterior threads for threading into interior threads on one of the bearing mounting holes on the frame. One block mounting bore may have interior threads formed thereon, and the interior threads of the block mounting bore may incompatible with the exterior threads of the mounting bolt such that the mounting bolt is (Continued)

not threadable into the block mounting bore. An apparatus and system is also disclosed.

17 Claims, 11 Drawing Sheets

SYSTEM AND METHOD FOR BEARING ASSEMBLY REMOVAL

BACKGROUND

Field

The present disclosure relates to bearings and more particularly pertains to a new system and method for bearing assembly removal which simplifies removal of a bearing assembly, particularly under field conditions.

SUMMARY

In one aspect, the present disclosure relates to an apparatus with a rotating element, and may comprise a frame having a frame surface and a plurality of bearing mounting holes being formed in the frame, with the bearing mounting holes having interior threads. The apparatus may also include a rotating body mounted on the frame and being rotatable with respect to the frame about a rotation axis. The apparatus may further include a bearing assembly configured to rotatably support a portion of the rotating body on the frame, and the bearing assembly may include a bearing support block positioned adjacent to the frame surface when mounted on the frame. The bearing support block may have a plurality of block mounting bores, and each of the block mounting bores may be axially alignable with one of the bearing mounting holes in the frame. The bearing assembly may also include at least one mounting bolt removably insertable into one of the block mounting bores of the bearing mounting block and into one of the bearing mounting holes on the frame. The at least one mounting bolt may have exterior threads compatible with the interior threads on one of the bearing mounting holes on the frame. At least one of the block mounting bores may have interior threads formed thereon, and the interior threads of the block mounting bore being incompatible with the exterior threads of the at least one mounting bolt such that the mounting bolt is not threadable into the at least one block mounting bore.

In another aspect, the disclosure relates to a bearing assembly for rotatably supporting a portion of a rotating body on a frame, and the bearing assembly may include a bearing support block for positioning adjacent to the frame, with the bearing support block having a plurality of block mounting bores for each being axially aligned with a bearing mounting hole formed in the frame. The bearing assembly may also include at least one mounting bolt removably insertable into one of the block mounting bores of the bearing mounting block and into one of the bearing mounting holes on the frame. The at least one mounting bolt may have exterior threads for threading into interior threads on one of the bearing mounting holes on the frame. At least one of the block mounting bores may have interior threads formed thereon, and the interior threads of the block mounting bore may be incompatible with the exterior threads of the at least one mounting bolt such that the mounting bolt is not threadable into the at least one block mounting bore.

In a further aspect, the disclosure relates to a method of removing a bearing assembly from a rotating body and from a frame supporting the rotating body. The method may include providing a bearing support block with a plurality of block mounting bores, with at least one of the block mounting bores having interior threads, removing at least one mounting bolt mounting the bearing support block to the frame, rotating the bearing support block on the rotating body with respect to the frame, mounting at least one dismounting bolt on the bearing support block by threading the dismounting bolt on the interior threads of the at least one block mounting bore, and abutting the dismounting bolt against the frame to push the bearing support block away from the frame.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
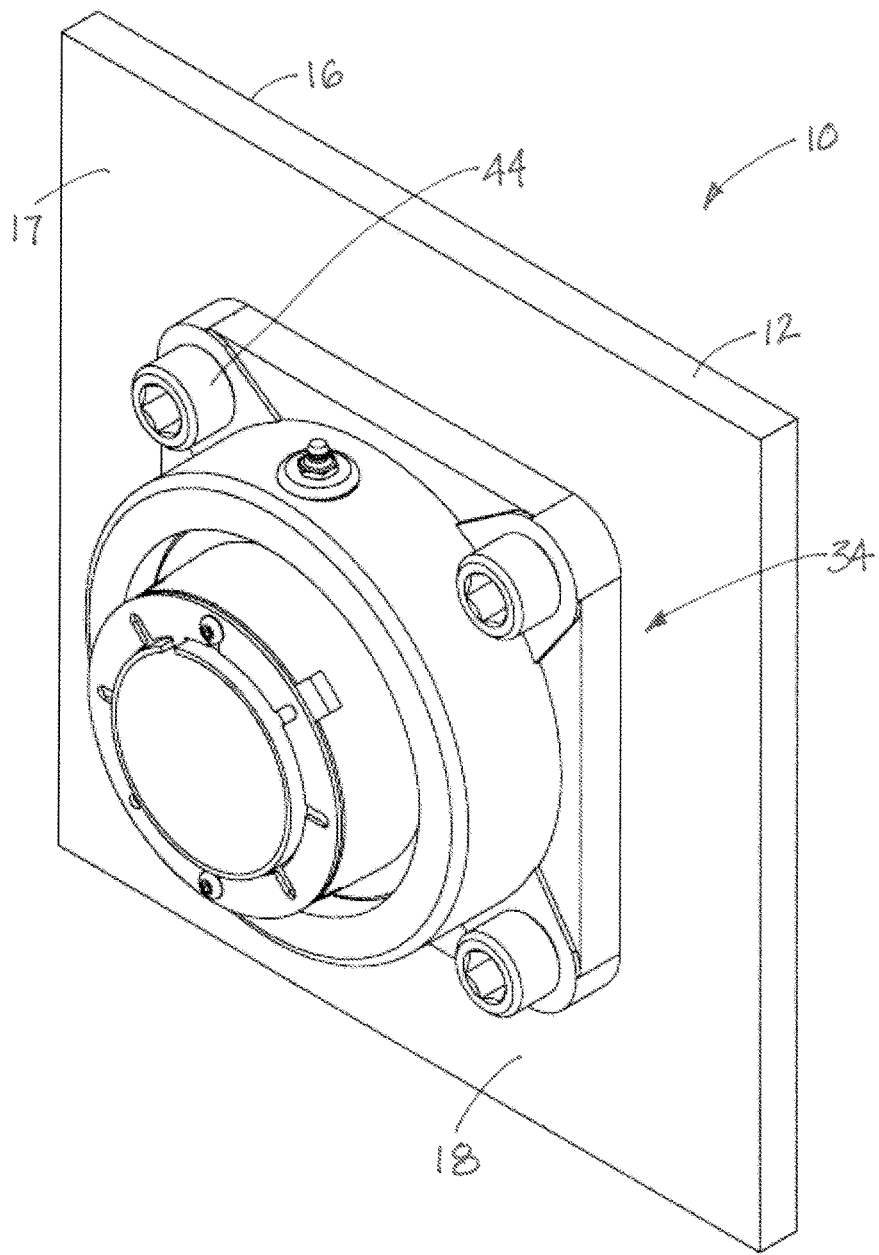
FIG. 1A is a schematic perspective view of a simplified embodiment of the present disclosure showing an illustrative bearing assembly mounted on a frame and supporting a rotating body in a typical operating configuration for the bearing assembly.
Figure 1B:
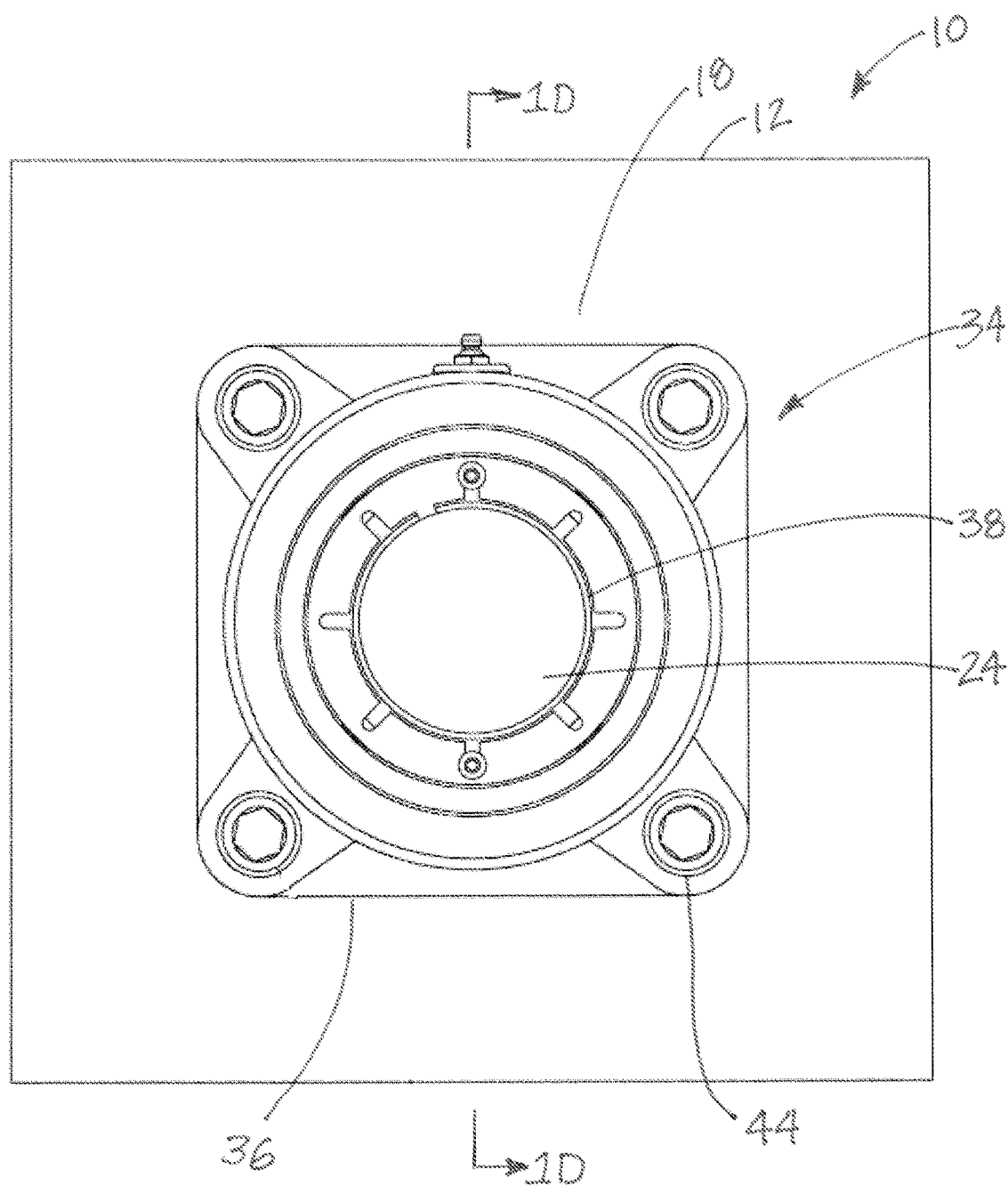
FIG. 1B is a schematic front view of the configuration of elements shown in FIG. 1A.
Figure 1C:
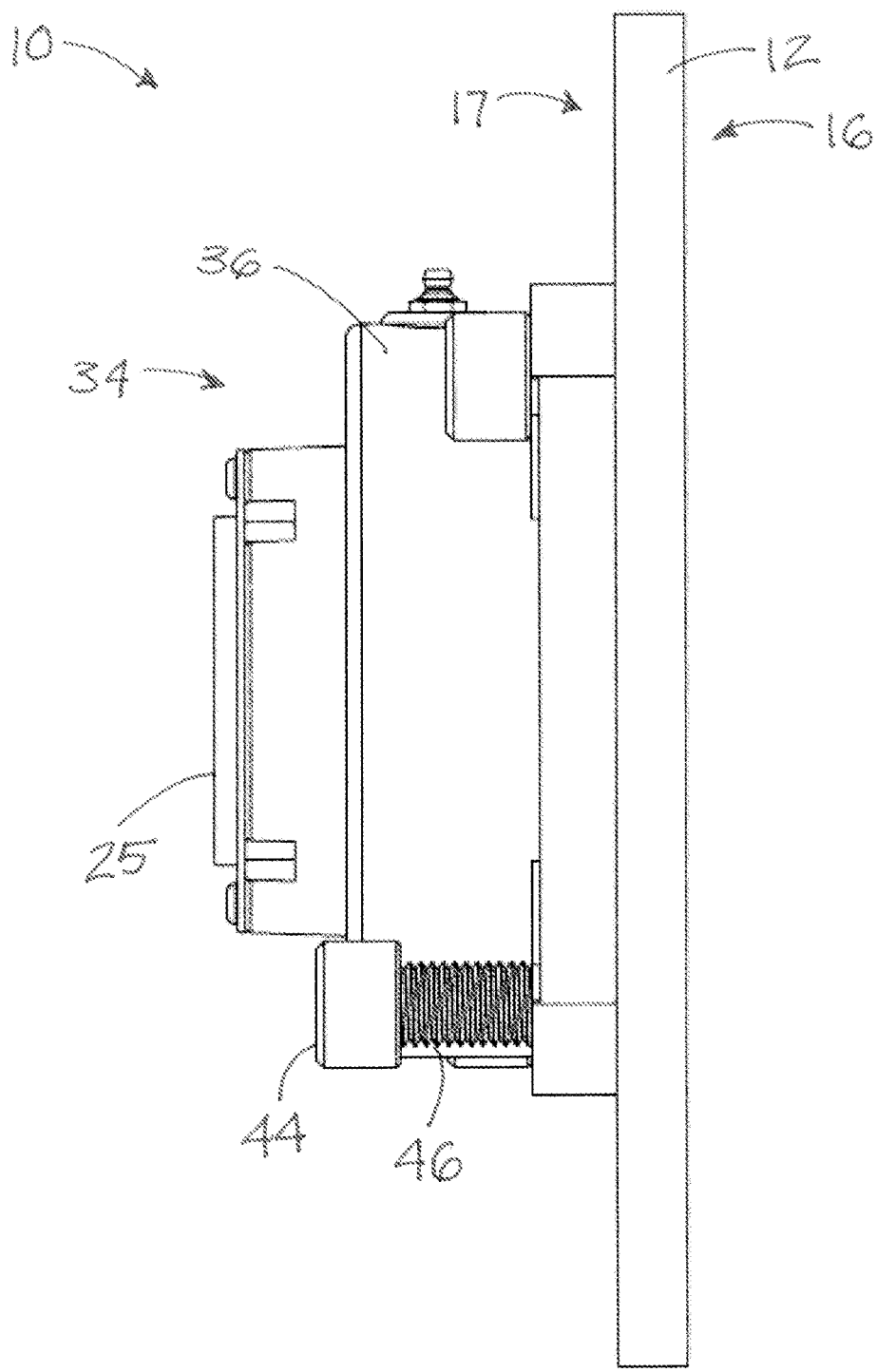
FIG. 1C is a schematic side view of the configuration of elements shown in FIG. 1A.
Figure 1D:
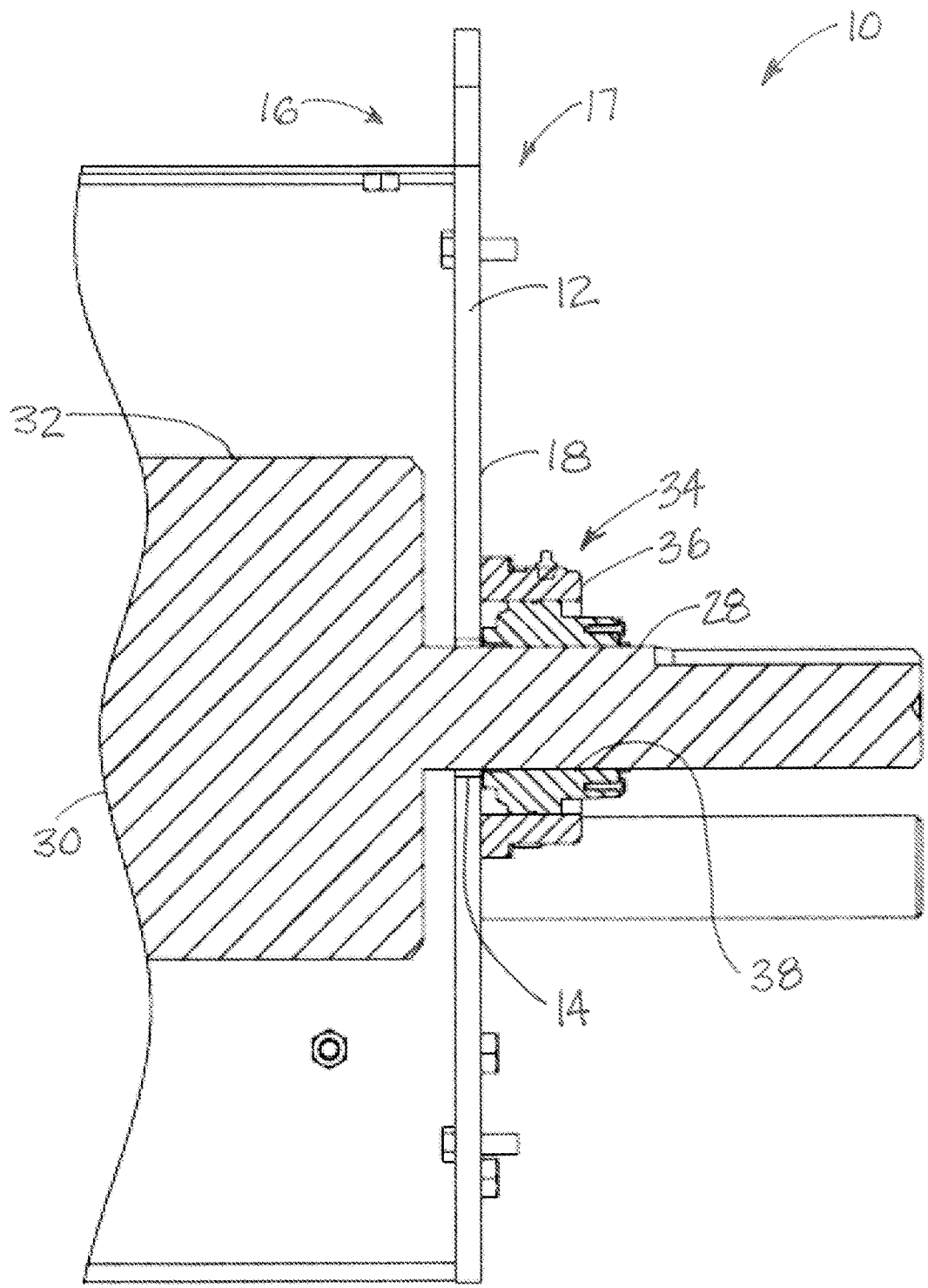
FIG. 1D is a schematic side sectional view of the configuration of elements shown in FIG. 1A, taken along line D-D shown in FIG. 1B.
Figure 2A:
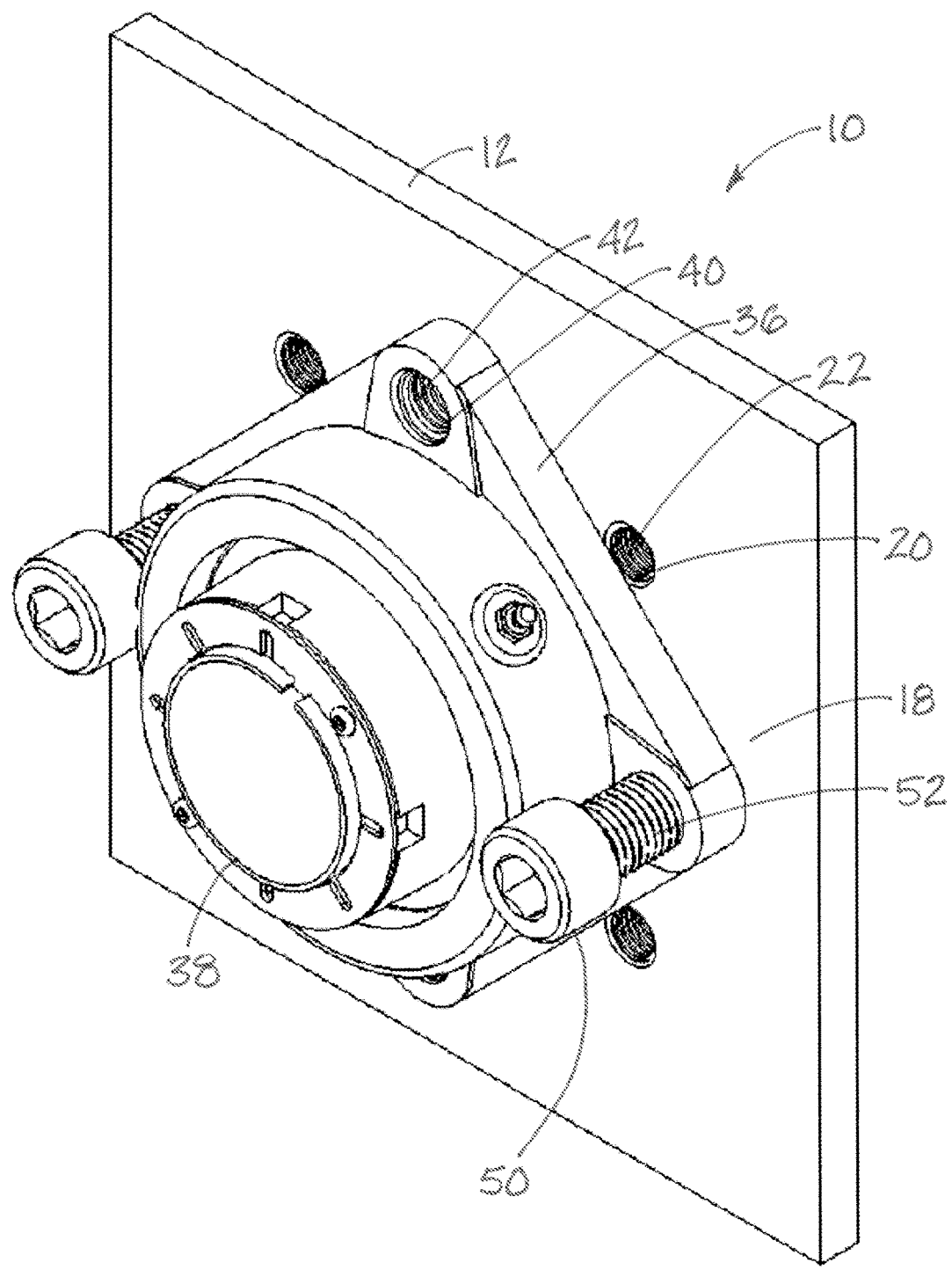
FIG. 2A is a schematic perspective view of a simplified embodiment of FIG. 1 showing the bearing mounting bolts removed and the bearing support block rotated so that the bearing block mounting bores are moved out of alignment with the bearing mounting holes in the frame while the block remains substantially abutted against the frame surface, and with dismounting bolts threaded into the mounting bores, according to an illustrative implementation of the disclosure.
Figure 2B:
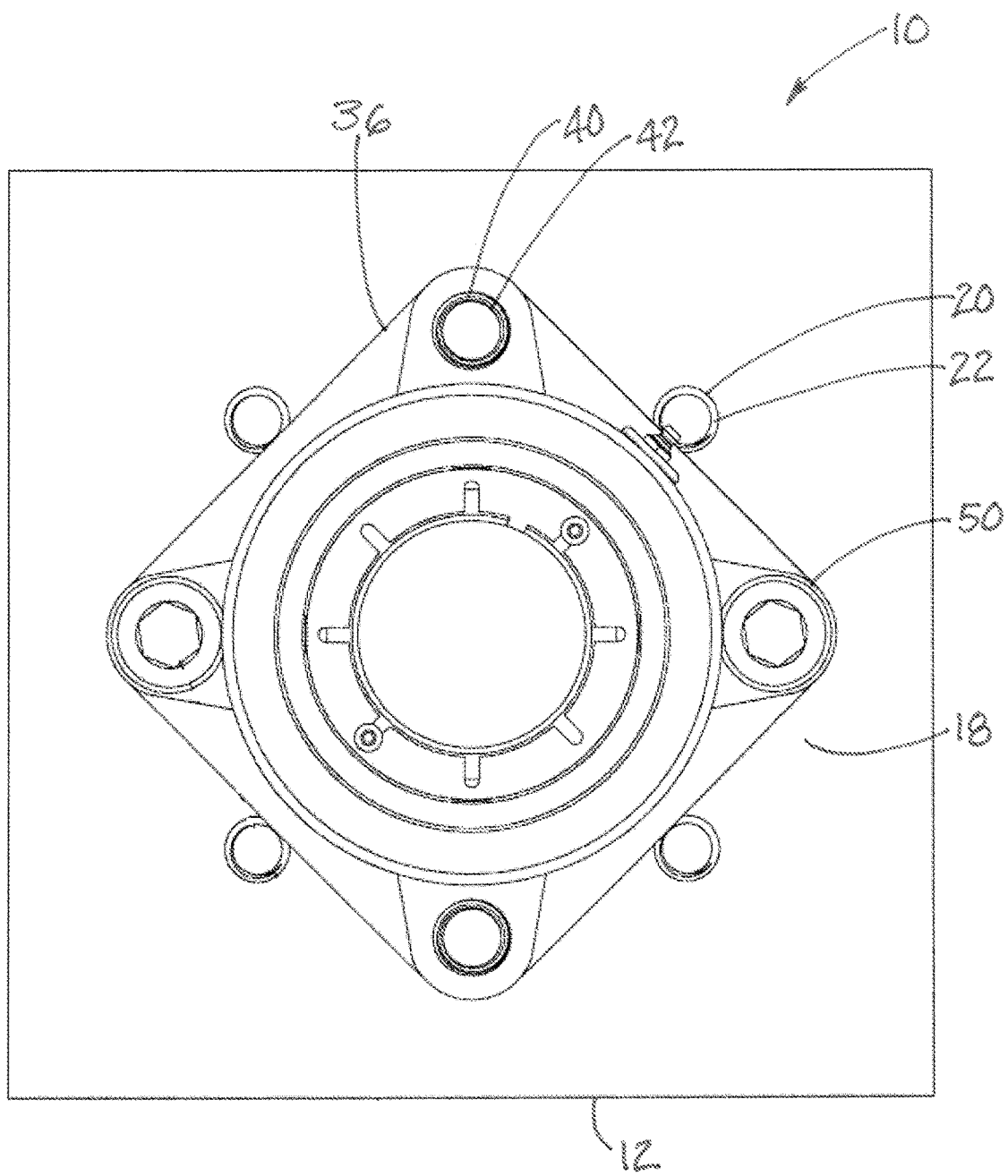
FIG. 2B is a schematic front view of the configuration of elements shown in FIG. 2A.
Figure 2C:
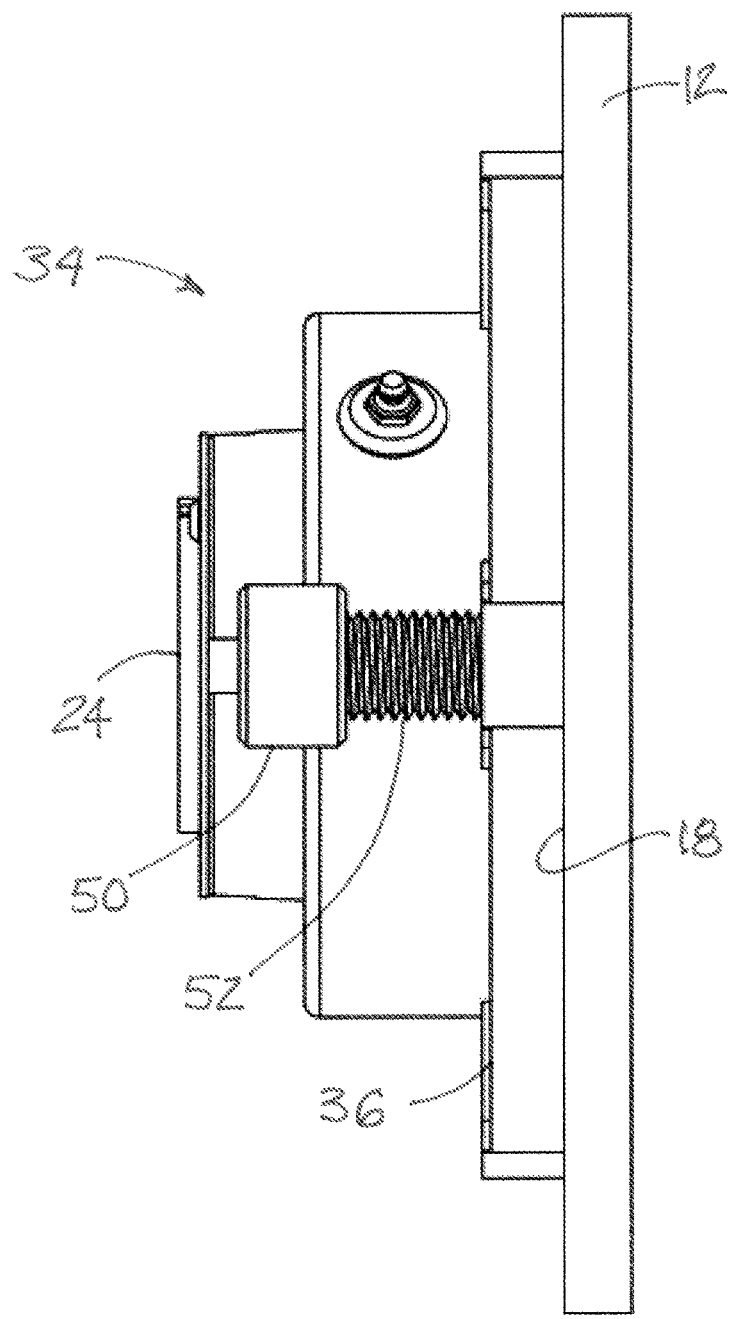
FIG. 2C is a schematic side view of the configuration of elements shown in FIG. 2A.
Figure 3A:
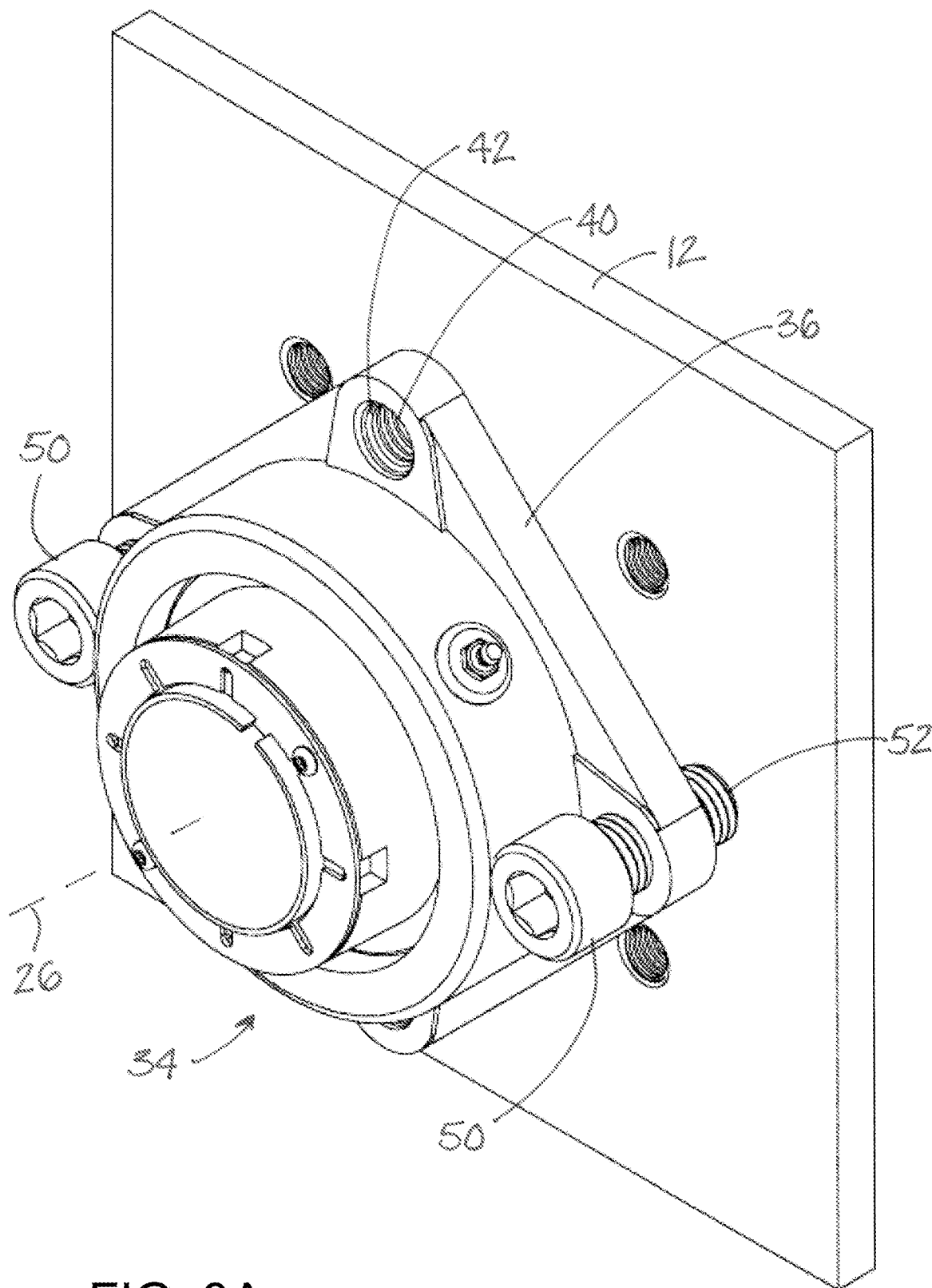
FIG. 3A is a schematic perspective view of the simplified embodiment of FIG. 1 showing the dismounting bolt advanced into the block mounting bores to abut the frame surface and push the bearing block away from the frame on the rotating body, according to an illustrative implementation of the disclosure.
Figure 3B:
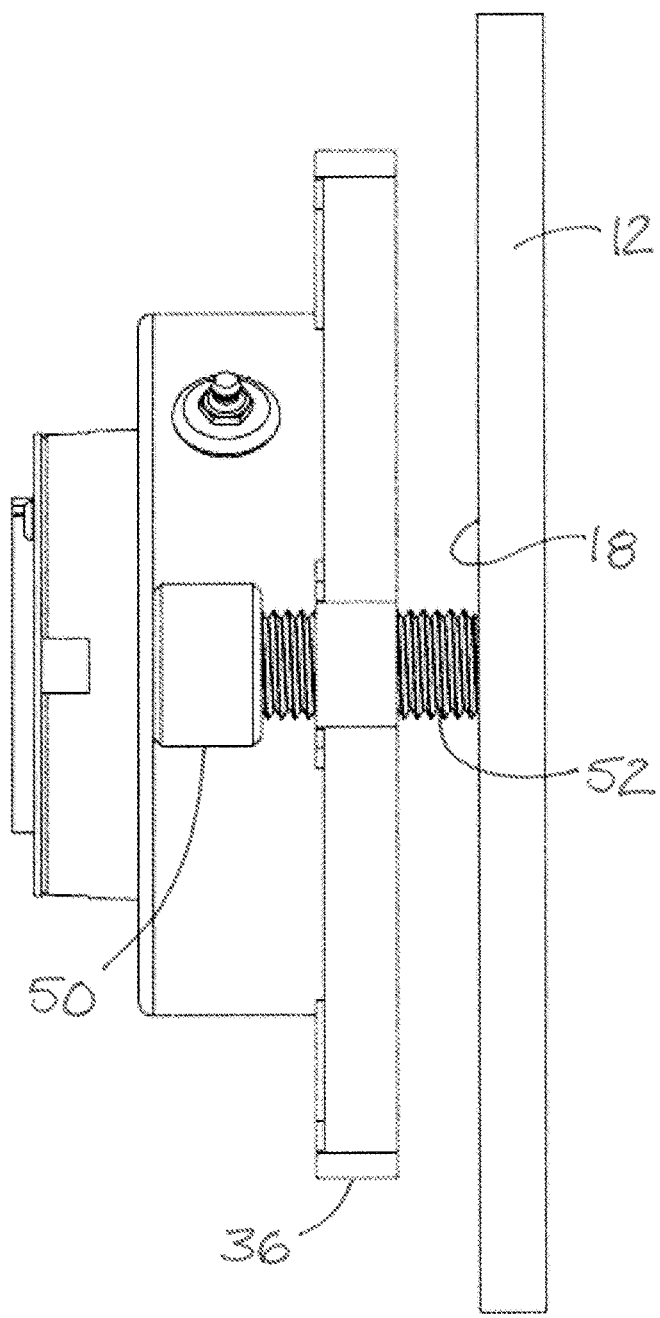
FIG. 3B is a schematic side view of the configuration of elements shown in FIG. 3A.
Figure 4:
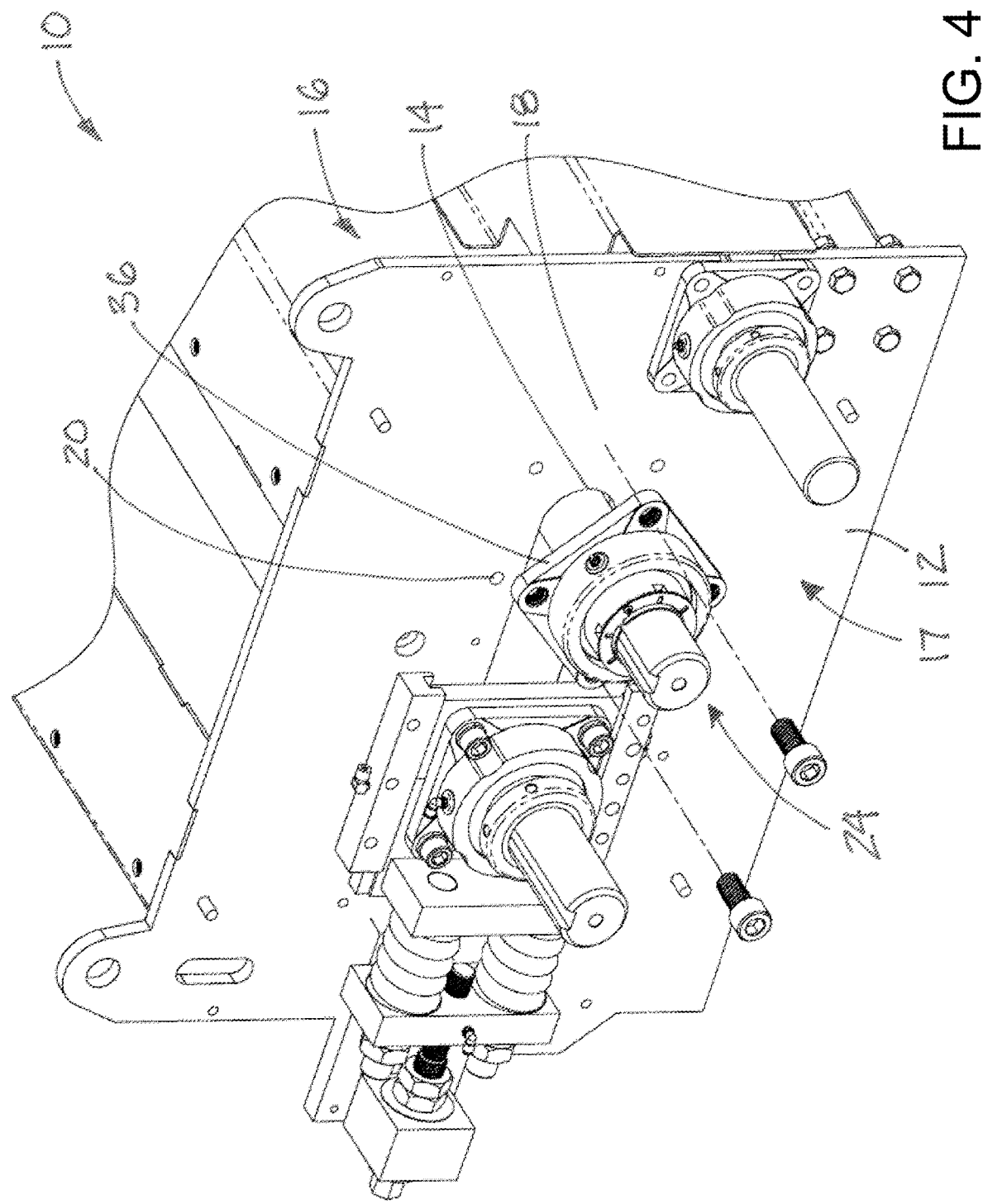
FIG. 4 is a schematic perspective view of a portion of a roller grinder apparatus employing aspects of the present disclosure and showing the bearing assembly in an exploded relationship to frame and the dismounting bolts in exploded relationship to the bearing block and frame.
Figure 5:
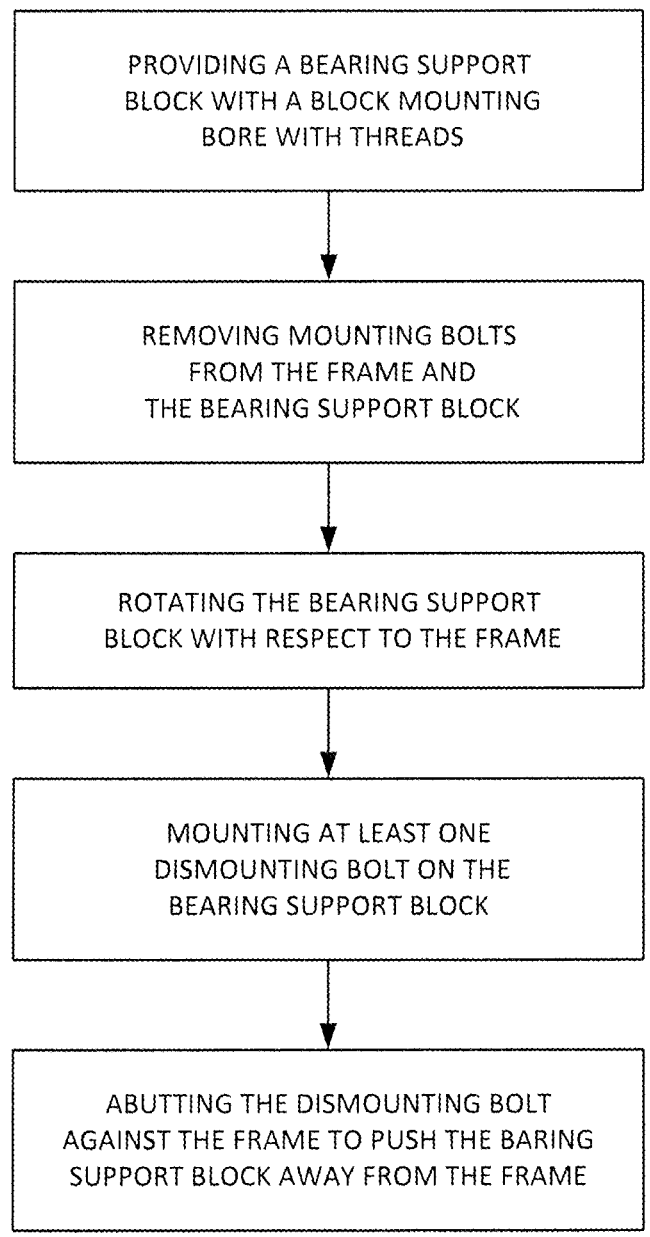
FIG. 5 is a schematic flow diagram depicting aspects of a method of the present disclosure.

With reference now to the drawings, and in particular to FIGS. 1 through 5 thereof, a new system and method for bearing assembly removal, embodying the principles and concepts of the disclosed subject, matter will be described.

The applicants understand that periodic servicing of bearing assemblies supporting rotating elements on frames of machinery may require removal and/or replacement of the bearing assembly from the rotating element and the supporting frame. While even under ideal conditions, removal of bearing assemblies for servicing can be difficult, many installations "in the field" present less than ideal conditions for servicing and often result in destruction of the bearing support housing to accomplish removal. For example, cutting the bearing support housing using an abrasive wheel and prying the housing open to release the bearing from the rotating element may be performed. Clearly this approach is less than desirable as it results in the destruction of the elements of the bearing and may lead to unintentional damage of nearby elements.

The applicants have developed techniques that facilitate the removal of the bearing assembly from the rotating element utilizing structures commonly present at the site of the installation of the bearing assembly, and without destruction of the bearing assembly. These techniques may include, for example, modifications of the bearing support block in a novel manner and processes not heretofore used in the removal of the bearing assembly from the rotating element.

In one aspect, the disclosure is directed to an apparatus 10 with a rotating element, such as, for example, a roller grinder apparatus for grinding particles into smaller particles, such as grains, The improvements of this disclosure are not specific to this application, and although aspects of the disclosure are illustratively described in terms of a roller grinding apparatus, other applications may be suitable for the disclosed technology.

The apparatus 10 may include a frame 12 with a frame opening 14 which may extend between an inner side 16 and an outer side 17. In some embodiments, the frame 12 may be formed in part by a wall or plate in which the frame opening 14 is located. The frame 12 may also have a frame surface 18 which is located adjacent to the frame opening 14 and is generally located on the outer side 17 of the frame. The frame opening 14 may extend along a frame opening axis, and the frame surface 18 may extend in a plane oriented substantially perpendicular to the frame opening axis.

A plurality of bearing mounting holes 20 may be formed in the frame 12 proximate to the frame opening 14 for supporting the mounting of the bearing assembly on the frame. The plurality of bearing mounting holes 20 may be generally uniformly spaced about the opening 14, and illustratively may include four bearing mounting holes, although other quantities of holes 20 may be utilized. The bearing mounting holes 20 may each have interior threads 22 formed thereon for engaging a threaded fastener.

The apparatus 10 may also include a rotating body 24 mounted on the frame 12. The rotating body 24 may be rotatable with respect to the frame about a rotation axis 26, and the rotation axis may be oriented substantially parallel to the frame opening axis. The rotating body 24 may have a first portion 28 which extends through the frame opening 14 and protrude out of the frame, and the first portion may terminate at an end of the rotating body. (The degree of protrusion is shown shortened somewhat in some of the drawing figures for the sake of clarity.) The first portion 28 may have an outer surface with a substantially cylindrical shape suitable for journaling in a bearing. The rotating body 24 may also have a second portion 30 which may be located on the inner side 16 of the frame 12. In some embodiments, the second portion 30 may have teeth 32 formed thereon which may extend along a length of the second portion, and may be oriented substantially parallel to the rotation axis 26 of the body 24. Illustratively, the rotating body 24 may comprise a grinding roll.

The apparatus 10 may further include a bearing assembly 34 removably mounted on the frame 12. The bearing assembly 34 may include a bearing support block 36 for supporting the rotating body 24 on the frame 12. The bearing support block 36 may be positioned adjacent to the frame opening 14 and the frame surface 18. In some embodiments, the bearing support block 36 is positioned over the frame opening 14 to at least partially receive the first portion 28 of the rotating body 24. The bearing support block 36 may define a journal 38 which is generally aligned with the frame opening 14 to receive the first portion 28 in a manner such that the body is rotatable in the journal 38.

The bearing support block 36 may include a plurality of block mounting bores 40, and each of the block mounting bores may be axially alignable with one of the bearing mounting holes 20 in the frame 12 such that the support block 36 is positioned to support the rotating body 24 in a suitable position with respect to the frame. The quantity of block mounting bores 40 generally corresponds to the quantity of bearing mounting holes 20.

As a significant aspect of the development of the present disclosure, at least one, and suitably at least two, of the block mounting bores 40 may have an interior thread 42 formed thereon. Conventionally, block mounting bores of bearing assemblies have substantially smooth surfaces, free of threads or other contouring that might engage fasteners passing through the mounting bores, specifically any threads formed on the fasteners, so as not to interfere with engagement between threads on the fastener and threads on the bearing mounting holes 20. Attempts to engage threads on a fastener with threads on the block mounting bores of a support block simultaneous with threads on the bearing mounting holes in a frame require perfect alignment and orientation of the interior threads which is typically not utilized or required for mounting the block on the frame.

The bearing assembly 34 may also include at least one mounting bolt 44 for mounting the bearing support block 36 on the frame 12. The mounting bolt 44 may be removably insertable into one of the block mounting bores 40 of the support block 36, and may extend through the bore and into one of the bearing mounting holes 20 in the frame 12. A plurality of the mounting bolts 44 may be utilized, and may generally correspond to the number of block mounting bores 40 in the support block 36, and the bearing mounting holes 20 in the frame 12. At least a portion of the mounting bolt or bolts 44 may have exterior threads 46 formed thereon to engage interior threads on the bearing mounting holes.

The apparatus 10 may also include at least one dismounting bolt 50 for use in dismounting the bearing support block 36 from the rotating body 24. The dismounting bolt 50 may be removably insertable into one of the block mounting bores 40 in the support block 36, and may extend through the mounting bore 40. A plurality of the dismounting bolts 50 may be utilized, and may comprise a pair of bolts 50. At least a portion of the dismounting bolt 50, or bolts, may have exterior threads 52 formed thereon.

Significantly, the configuration (e.g., the diameter size) of the mounting bolt 44 relative to the configuration (e.g., the diameter size) of the block mounting bore 40 may be such that the mounting bolt 44 may be slidable through the block mounting bore 40 of the bearing support block 36, and may be translatable through the bore 40 without the exterior threads 46 on the bolt 44 engaging the interior threads 42 on the bore 40 in any substantial way, such as would require rotation of the bolt 44 to advance the mounting bolt into and through the bore 40. As such, the exterior threads 46 on the mounting bolt 44 do not engage the interior threads 42 formed on the block mounting bores 40. The interior threads 42 of the block mounting bores 40 may be incompatible with the exterior threads 42 of the mounting bolt 44 such that the mounting bolt 44 is not threadable into the at least one block mounting bore, but still may be moved into and through the block mounting bore. For the purposes of this disclosure, incompatible threads may be threads that have at least one characteristic that makes exterior and interior threads unable to mesh and permit advancement of an element having the interior threads into an element having the exterior threads.

The configuration (e.g., the diameter size) of the dismounting bolt 50 relative to the configuration (e.g., the diameter size) of the block mounting bore 40 of the support block 36 may be so that the exterior threads 52 of the bolt 50 engage the interior threads 42 on the block mounting bores 40 such that rotation of the dismounting bolt 50 is required to advance the bolt 50 into the mounting bore 40, and through the bore 40, so that the end of the bolt 50 may contact and abut against the frame surface 18 of the frame 12. The exterior threads 52 of the dismounting bolt 50 may be compatible with the interior threads 42 on the block mounting bore 40 such that the dismounting bolt is threadable into the block mounting bore with interior threads. The exterior threads 52 on the dismounting bolt 50 may be incompatible with the interior threads 22 on the plurality of bearing mounting holes 20 such that the dismounting bolt is not threadable into the bearing mounting holes.

In another aspect, the disclosure relates to a method of removing a bearing assembly from a rotating body, and from a frame supporting the rotating body.

In implementations, the method may include providing an apparatus having various elements and features of the illustrative apparatus 10 of this disclosure, such as, for example, the bearing assembly 34 with one or more block mounting bores 40 having interior threads 42.

The method may also include removing the mounting bolts 44 mounting the bearing support block 36 of the bearing assembly 34 on the frame 12. The removal of the mounting bolts 44 may include withdrawing the mounting bolt or bolts from the bearing mounting holes 20 formed in the frame 12, and may comprise rotating each mounting bolt with respect to the frame 12 to remove the mounting bolt from the respective bearing mounting hole such that the exterior threads 46 of the mounting bolt 44 are removed from engagement with the interior threads 22 of the bearing mounting holes 20. The removal of the mounting bolts 44 may further include withdrawing the mounting bolt or bolts from the block mounting bore or bores 40 of the bearing support block 36, and may comprise translating each mounting bolt through the respective block mounting bore 40 without the necessity of rotation of the mounting bolt, as the exterior threads 46 of the mounting bolt 44 do not effectively engage the interior threads 42 of the block mounting bores 40.

The method may further include rotating the bearing support block 36 with respect to the frame 12, which may move at least one of the block mounting bores 40 of the support block 36 out of axial alignment with an associated bearing mounting hole 20 of the frame 12, and thereby produce a misalignment, or positioning out of alignment, of the block mounting bores 40 with respect to the bearing mounting holes 20. Rotating the bearing support block 36 with respect to the frame 12 may also produce rotation of the support block 36 with respect to the rotating body 24, such that the support block rotates or pivots on the body. Illustratively, rotation of approximately 45 degrees about the rotation axis 26 of the rotating body 24 may be utilized, but rotations of smaller or greater degree may also be utilized to produce a suitable misalignment. It will be recognized that utilization of a dismounting bolt having a size too large to enter the bearing mounting holes in the frame may permit avoidance of rotation for misalignment, as the dismounting bolt may bear against the mounting hole without entering it, but such practice is generally not preferred.

The method may include mounting at least one dismounting bolt 50 on the bearing support block 36, which may include threading the dismounting bolt 50 into the block mounting bore 40 of the bearing support block 36. Threading the dismounting bolt or bolts 50 on the support block 36 may include inserting the dismounting bolt 50 into the block mounting bore 40 and rotating the dismounting bolt 50 with respect to the bearing support block 36 to engage the exterior threads 52 on the bolt 50 with the interior threads 42 of the block mounting bores 40. Optionally, and in some implementations preferably, the method may include mounting a pair of the dismounting bolts 50 in respective block mounting bores 40, and the mounting bores may be located on substantially opposite locations on the bearing support block 36. With greater resistance to removal of the bearing assembly from the rotating body, additional dismounting bolts may be utilized to apply greater separation forces without undue stresses to the elements.

The method may also include abutting the dismounting bolt 50 against the frame 12 to push the bearing support block 36 away from the frame 12, as a reaction to the force applied by the bolt 50 to the frame 12. Abutting the dismounting bolt against the frame 12 may include contacting the dismounting bolt 50, such as the end of the bolt 50, against the frame surface 18 of the frame, and rotating the dismounting bolt 50 to further extend a portion of the bolt 50 from the bearing support block 36 to extend to the frame surface 18 and press against the frame surface, and thus the frame 12, to move the bearing support block away from the frame 12 and creation of a degree of spacing between the elements.

By utilization of aspects of the method, a space may be created between the frame surface 18 of the frame 12 and the base of the bearing support block 36 which may either fully disengage the bearing assembly 34 from the rotating body 24, or create sufficient space between the frame surface 18 and the bearing support block 36 to permit tools to be inserted into the space to expand the space and move the bearing assembly off of the rotating body.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An apparatus with a rotating element, the apparatus comprising:
    a frame having a frame surface, a plurality of bearing mounting holes being formed in the frame, the bearing mounting holes having interior threads;
    a rotating body mounted on the frame and being rotatable with respect to the frame about a rotation axis,
    a bearing assembly configured to rotatably support a portion of the rotating body on the frame, the bearing assembly comprising:
        a bearing support block positioned adjacent to the frame surface when mounted on the frame, the bearing support block having a plurality of block mounting bores, each of the block mounting bores being axially alignable with one of the bearing mounting holes in the frame; and
        at least one mounting bolt removably insertable into one of the block mounting bores of the bearing support block and into one of the bearing mounting holes on the frame, the at least one mounting bolt having exterior threads being compatible with the interior threads on one of the bearing mounting holes on the frame;
    wherein at least one of the block mounting bores has interior threads formed thereon, the interior threads of the block mounting bore being incompatible with the exterior threads of the at least one mounting bolt such that the mounting bolt is not threadable into the at least one block mounting bore.

2. The apparatus of claim 1 additionally comprising at least one dismounting bolt for use in dismounting the bearing support block from the rotating body; and
    wherein the dismounting bolt has exterior threads, the exterior threads of the dismounting bolt being compatible with the interior threads on the at least one block mounting bore such that the dismounting bolt is threadable into the at least one block mounting bore with interior threads.

3. The apparatus of claim 2 wherein the exterior threads on the dismounting bolt are incompatible with the interior threads on the plurality of bearing mounting holes such that the dismounting bolt is not threadable into the bearing mounting holes.

4. The apparatus of claim 2 wherein the at least one dismounting bolt comprises a plurality of the block dismounting bolts for each being threaded into one of the blocking mounting bores of the bearing support block.

5. The apparatus of claim 1 wherein the at least one mounting bolt is translatable through the block mounting bore without rotation of the mounting bolt.

6. The apparatus of claim 1 wherein the at least one mounting bolt is translatable through the block mounting bore without the exterior threads of the mounting bolt engaging the interior threads of the block mounting bore.

7. The apparatus of claim 1 additionally comprising at least one dismounting bolt for use in dismounting the bearing support block from the rotating body; and
    wherein the dismounting bolt has exterior threads engaging the interior threads of the block mounting bore of the bearing support block such that rotation of the dismounting bolt is required to advance the dismounting bolt in the block mounting bore.

8. The apparatus of claim 1 wherein the frame has a frame opening through which a portion of the rotating body protrudes, the frame surface being located adjacent to the frame opening, the bearing mounting holes being located proximate to the frame opening.

9. The apparatus of claim 1 wherein the rotating body has a first portion received in a journal formed by the bearing assembly, and a second portion the second portion having grinding teeth.

10. A bearing assembly for rotatably supporting a portion of a rotating body on a frame, the bearing assembly comprising:
    a bearing support block for positioning adjacent to the frame, the bearing support block having a plurality of block mounting bores for each being axially aligned with a bearing mounting hole formed in the frame; and
    at least one mounting bolt removably insertable into one of the block mounting bores of the bearing support block and into one of the bearing mounting holes on the frame, the at least one mounting bolt having exterior threads for threading into interior threads on one of the bearing mounting holes on the frame;
    wherein at least one of the block mounting bores has interior threads formed thereon, the interior threads of the block mounting bore being incompatible with the exterior threads of the at least one mounting bolt such that the mounting bolt is not threadable into the at least one block mounting bore.

11. The assembly of claim 10 additionally comprising at least one dismounting bolt for use in dismounting the bearing support block from the rotating body; and wherein the dismounting bolt has exterior threads, the exterior threads of the dismounting bolt being compatible with the interior threads on the at least one block mounting bore such that the dismounting bolt is threadable into the at least one block mounting bore with interior threads.

12. The assembly of claim 11 wherein the at least one dismounting bolt comprises a plurality of the block dismounting bolts for each being threaded into one of the blocking mounting bores of the bearing support block.

13. A method of removing a bearing assembly from a rotating body and from a frame supporting the rotating body. The method including:

providing a bearing support block with a plurality of block mounting bores, at least one of the block mounting bores having interior threads;

removing at least one mounting bolt mounting the bearing support block to the frame;

rotating the bearing support block on the rotating body with respect to the frame;

mounting at least one dismounting bolt on the bearing support block by threading the dismounting bolt on the interior threads of the at least one block mounting bore; and abutting the dismounting bolt against the frame to push the bearing support block away from the frame.

14. The method of claim 13 wherein mounting the at least one dismounting bolt on the bearing support block includes inserting the dismounting bolt into the block mounting bore and rotating the dismounting bolt with respect to the bearing support block to engage the exterior threads on the dismounting bolt with the interior threads on the bearing support block.

15. The method of claim 13 wherein abutting the dismounting bolt includes rotating the dismounting bolt with respect to the bearing support block to extend the dismounting bolt through the bearing mounting block to contact a frame surface of the frame.

16. The method of claim 13 wherein abutting the dismounting bolt includes rotating the exterior threads of the dismounting bolt with respect to the interior threads of the bearing support block to extend the dismounting bolt through the bearing mounting block to contact a frame surface of the frame.

17. The method of claim 13 wherein rotating the bearing support block include moving the at least one block mounting bore out of axial alignment with a bearing mounting hole formed in the frame.

* * * * *